United States Patent [19]

Kumar

[11] 3,909,013
[45] Sept. 30, 1975

[54] COUNTERWEIGHTED APEX SEAL FOR ROTARY ENGINES

[75] Inventor: Vasant R. Kumar, Paterson, N.J.

[73] Assignee: Curtiss-Wright Corporation, Wood Ridge, N.J.

[22] Filed: June 5, 1974

[21] Appl. No.: 476,653

[52] U.S. Cl................................ 277/25; 418/115
[51] Int. Cl.²........................................ F16J 15/42
[58] Field of Search...................... 277/25; 418/115

[56] References Cited
UNITED STATES PATENTS
3,444,843  5/1969  Sabet.................................. 418/115

Primary Examiner—Robert I. Smith
Attorney, Agent, or Firm—Victor D. Behn; Arthur Frederick

[57] ABSTRACT

A rotary mechanism of the Wankel type in which each apex seal has a counterweight disposed radially inwardly of the seal and being connected thereto so that the centrifugal force on the counterweight opposes radial motion of its apex seal as a result of the centrifugal force acting on the seal and in which the apex seal is provided with an additional weight also disposed radially inwardly of the seal so that the center of gravity of the combined apex seal and its weight is disposed at substantially the same radial distance from the rotor center as the center of gravity of the counterweight.

3 Claims, 6 Drawing Figures

COUNTERWEIGHTED APEX SEAL FOR ROTARY ENGINES

BACKGROUND OF THE INVENTION

The invention relates to seals for rotary mechanisms such as rotary pumps, rotary expansion engines and/or rotary internal combustion engines and is particularly directed to apex seals for rotary combustion engines of the type (Wankel-type) disclosed in U.S. Pat. No. 2,988,065. More specifically, the invention is directed to counterweighted seals such as disclosed in copending application Ser. No. 381,719 filed July 23, 1973 by applicant's assignee.

Said co-pending application discloses a counterweighted apex seal for the rotor of a Wankel-type rotary engine. In such an engine the rotor has a planetary rotation about the engine axis and therefore the direction of the centrifugal force on each apex seal relative to the rotor housing continually changes during each revolution of the rotor about the engine axis. The counterweighted seal configuration of said co-pending application is such that the apex seal contact pressure against the rotor housing resulting from the centrifugal forces on the seal configuration is substantially constant for each particular rotational speed of the rotor notwithstanding the fact that the direction of said centrifugal forces relative to the rotor housing are continually changing during revolution. In this way the counterweighted seal configuration of said co-pending application avoids the large variations in the apex seal contact pressures against the rotor housing which would otherwise occur during each revolution of the rotor.

Although with the counterweighted seal configuration of said co-pending application, the apex seal contact pressure against the rotor housing resulting from centrifugal forces is substantially constant for a particular rotative speed of the rotor, this contact pressure does increase with the square of the rotative speed of the engine. Any increase in the seal contact pressure with increase in engine speed is contrary to the requirements for adequate sealing of a rotary engine. Thus, in a rotary engine of the Wankel-type the maximum apex seal contact pressure is required at low engine speeds particularly when the engine is idling or is being started. As the engine rotative speed increases, the contact pressure of the apex seals can be decreased and still provide adequate sealing. Hence, any increase in the seal contact pressure with engine speed results in an unnecessary increase in the energy losses caused by friction between the apex seals and the rotor housing.

SUMMARY OF THE INVENTION

It is therefore an object of the invention to provide a counterweighted seal configuration for a rotary mechanism such that contact pressure of the seals does not increase with engine speed because of the centrifugal forces on the seals.

More specifically, it is an object of the invention to provide a counterweighted seal configuration for the apex seals of a Wankel-type rotary engine such that contact pressure of the apex seals on the rotor housing, as a result of the centrifugal forces on the seals, is reduced substantially to zero at all rotative speeds of the engine.

In accordance with the invention, each apex seal strip of a rotary engine is provided with a counterweight disposed radially inwardly of the apex seal strip substantially as disclosed in the aforementioned co-pending application and the apex seal is provided with an additional weight rigidly connected to the seal, this additional weight also being disposed radially inwardly of the seal strip. The purpose of this additional weight is to move the center of gravity of the apex seal inwardly toward the rotor center so that it is disposed at substantially the same radial distance from the rotor center as is the center of gravity of the counterweight. As is hereinafter fully described, when these two radial dimensions are substantially equal, the contact pressure of each apex seal on the rotor housing, as a result of centrifugal forces, becomes substantially equal to zero regardless of the rotative speed of the engine. With such a configuration therefore, the apex seal contact pressure does not increase with increase in the rotative speed of the engine. In this way energy losses, because of friction between each apex seal and the rotor housing, is reduced.

Other objects of the invention will become apparent upon reading the following detailed description in connection with the drawings.

DESCRIPTION OF PREFERRED EMBODIMENTS

Figure 1:
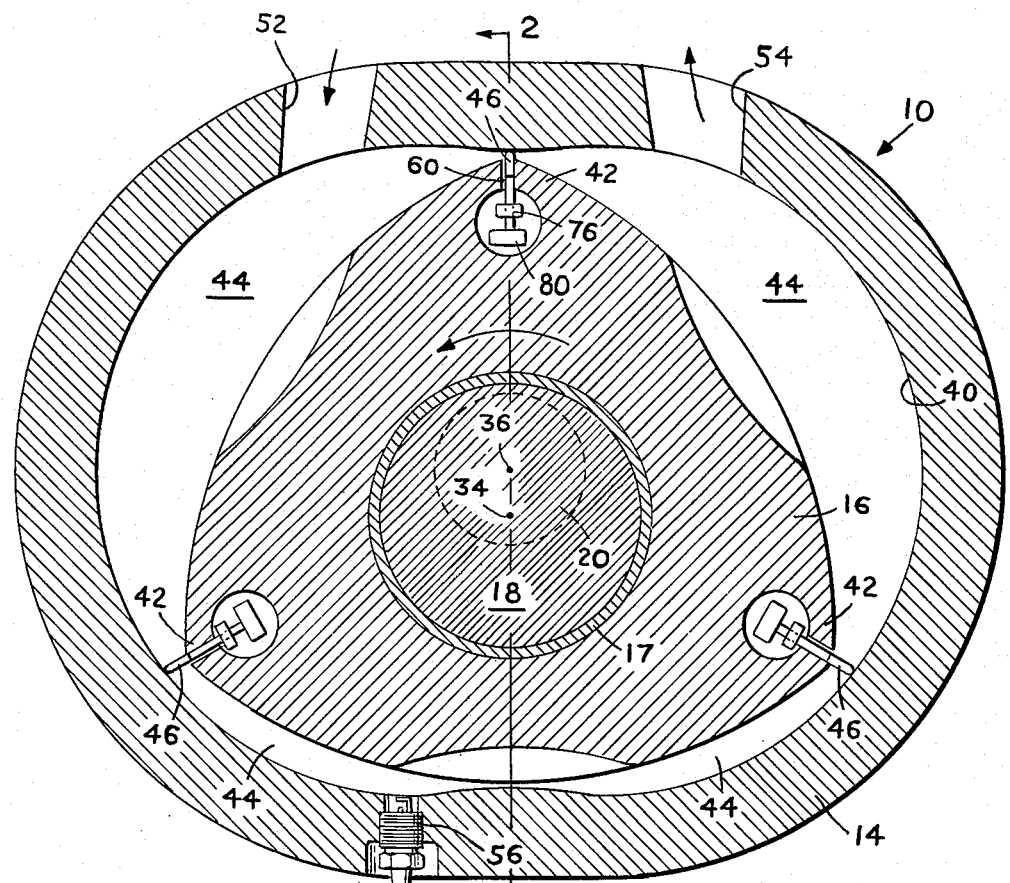
FIG. 1 is a transverse sectional view of a rotary combustion engine embodying the invention and taken along line 1—1 of FIG. 2.
Figure 2:
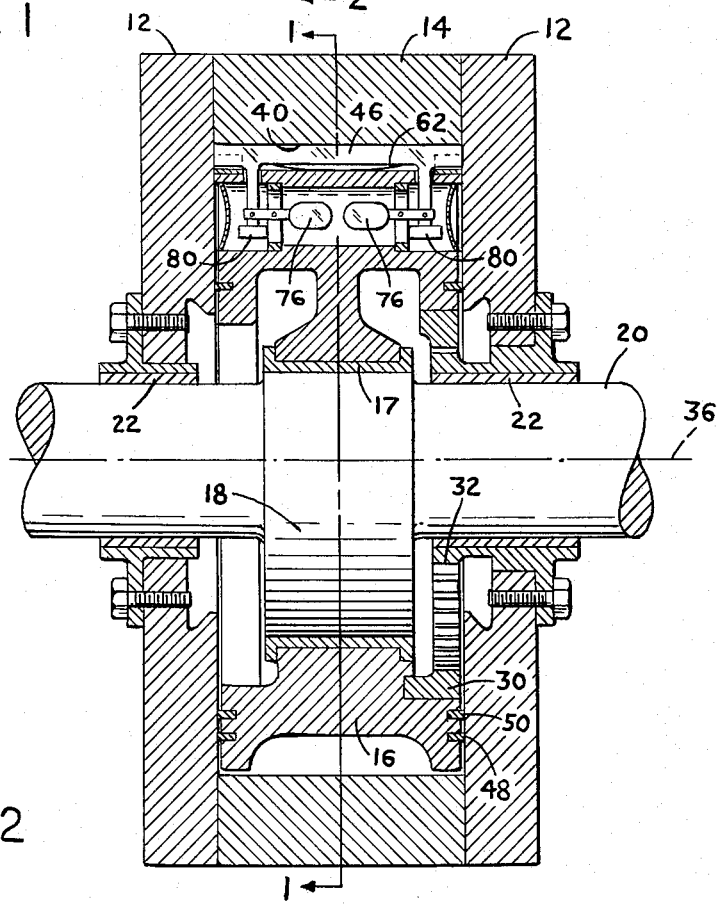
FIG. 2 is a sectional view taken along line 2—2 of FIG. 1.

Referring to the drawing, particularly to FIGS. 1 and 2, a rotary combustion engine is schematically indicated at 10, the engine being generally similar to that disclosed in aforementioned prior U.S. Pat. No. 2,988,065. The engine 10 comprises an outer body or housing consisting of two axially spaced end housings 12 and an intermediate or rotor housing 14. These housings are secured together to form a rigid housing structure with an engine cavity therein. An inner body or rotor 16 is mounted for planetary rotation within the housing cavity and for this purpose is journaled by a bearing 17 on an eccentric portion 18 of a shaft 20. The shaft 20 extends co-axially through and is supported by bearings 22 in the end housings 12, the axis of the shaft 20 being perpendicular to the inner wall surfaces of the end housings.

For controlling the planetary rotation of the rotor 16, an internal gear 30 is co-axially secured to the rotor and is disposed in mesh with fixed external gear 32 secured to one of the end housings 12, the gear 32 being coaxial with the shaft 20. The axes of the rotor 16 and shaft 22 are indicated at 34 and 36 respectively in FIG. 1. The radii of the pitch circles of the gears 30 and 32 are in the ratio of 3 to 2 whereby as described in prior U.S. Pat. No. 2,988,065, the shaft 20 makes 3 revolutions for each revolution of the rotor 16 about its axis.

The peripheral inner surface 40 of the intermediate housing 14 is illustrated in FIG. 1 as having a two-lobe profile which basically is an epitrochoid. The rotor 16 has a generally triangular profile with apex portions 42 having sealing cooperation with the peripheral inner surface 40 so as to divide the portion of the engine cavity between the rotor and housing surface 40 into three working chambers 44.

The rotor 16 is provided with apex seal strips 46 extending axially across each rotor apex portion 42. In addition, the rotor 16 is provided with the usual gas seal strips 48 on the rotor sides extending between the apex seal strips 46 so as to seal the working chambers 44. An oil seal ring 50 is also provided on each rotor side inwardly of the gas seal strips.

The rotor housing is provided with the usual intake and exhaust ports 54 and 52 respectively, for the working chambers 44 and a spark plug 56 is provided for igniting the combustion mixture.

Figure 3:
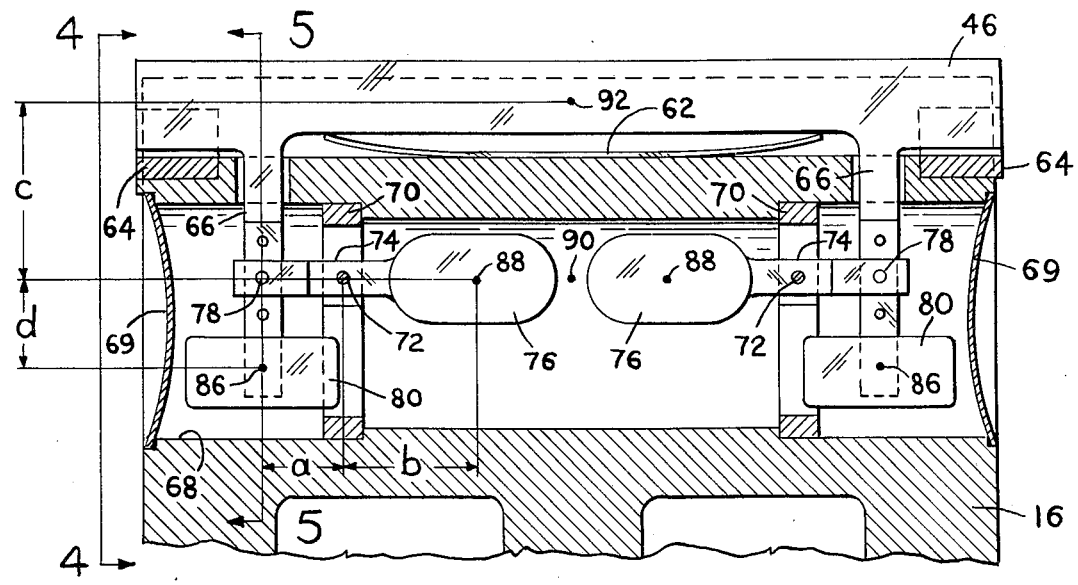
FIG. 3 is an enlarged view of the counterweighted apex seal structure illustrated in FIG. 2.
Figures 4, 5:
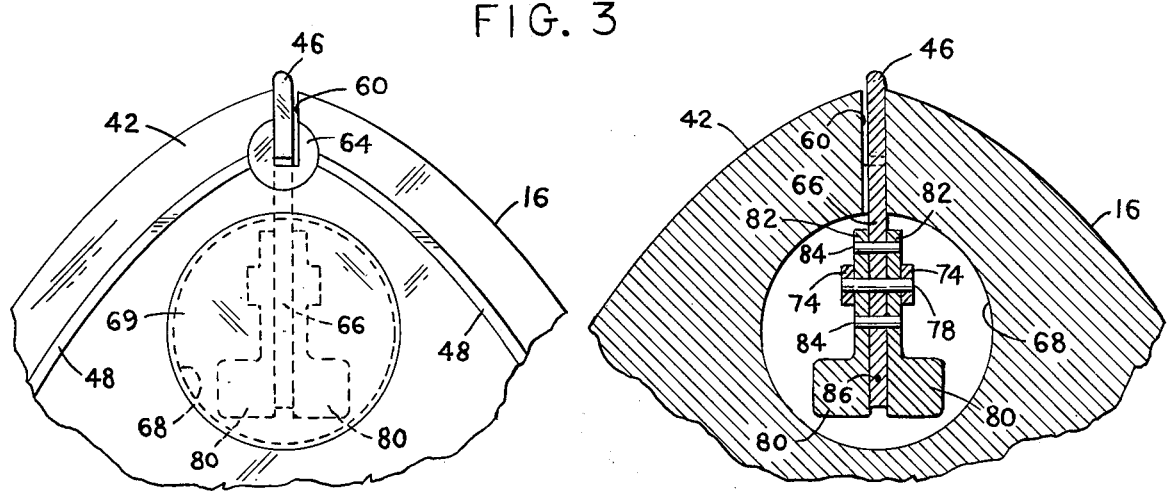
FIG. 4 is an end view taken along line 4—4 of FIG. 3.
FIG. 5 is a sectional view taken along line 5—5 of FIG. 3.

Reference is now made particularly to FIGS. 3–5. As there shown, each apex seal strip 46 is received in a slot 60 which extends axially across the associated rotor apex portion 42. The apex seal strip 46 is radially movable in the rotor slot 60 for engagement with the inner surface 40 of the rotor housing. A spring 62 may be provided under each apex seal strip 46 for urging the seal strip radially outwardly into engagement with said surface 40. The ends of each apex seal strip 46 are received within slots in cylindrical end pins 64. The cylindrical pins 64 provide seal continuity between the apex seal strips 46 and the side seal strips 48 in a manner generally similar to the more detailed description in prior U.S. Pat. No. 3,033,180.

The structure of the rotary engine 10 so far described is conventional and is generally similar to that disclosed in aforementioned prior U.S. Pat. No. 2,988,065. Reference, therefore, can be made to said prior patent for a detailed description of the mode of operation of such an engine.

Each apex seal strip 46 has an extension 66 adjacent one end and extending radially inwardly therefrom into a bore 68 extending axially across the rotor radially inwardly of the apex seal strip. A closure plate 69 preferably is fitted across each end of each rotor bore 68. A support ring 70 is secured to the rotor within the bore 68 for supporting a pivot pin 72. A lever 74 is pivotally mounted on the pivot pin 72. The inner end of the lever 74 is provided with a counterweight 76 rigidly connected thereto and the other end of the lever 74 is bifurcated and is pivotally connected by a pin 78 to the seal extension 66. For reasons of symmetry a similar radially inward extension 66 and counterweight 76 with an interconnecting lever 74 is provided at the other end of each apex seal strip 46.

In addition to the counterweights 76, each apex seal strip 46 is provided with a weight 80 secured at the inner end of radially inward extension 66 of said seal. As best seen in FIG. 5, each weight 80 consists of a pair of weights each having an arm 82 which is secured to the seal extension 66 as by pins 84. In this way each weight 80 is rigidly attached to its apex seal 46. For reasons hereinafter explained, each weight 80 preferably is disposed radially inwardly not only of its apex seal strip 46 but also the center of mass of each weight 80 indicated at 86 is disposed radially inwardly of the center of mass 88 of the counterweights 76.

With the rotary engine apex seal structure described, the contact pressure Fn exerted by each apex seal 46 on the trochoidal surface 40 due to centrifugal force at a particular engine rotative speed can be expressed by the following equation.

$$Fn = \frac{ew^2}{g} \left[ \frac{W_s R_s}{9e} - \frac{\frac{b}{a} W_c R_c}{9e} - \left(W_s - \frac{b}{a} W_c\right) \cos \frac{2\theta}{3} \right]$$

where
- $e$ is the eccentricity or distance of the rotor axis 34 from the axis 36 of the shaft 20.
- $w$ is the angular velocity of the shaft 20.
- $R_s$ is the radius of the center of mass of the apex seal weight $W_s$ (i.e. without the counterweights 76) from the rotor axis 34.
- $R_c$ is the radius of the center of mass of the weight $W_c$ of the counterweights 76 from the rotor axis 34.
- $\theta$ is the crank angle of the eccentric 18 of the shaft 20 as measured from the rotor position shown in FIG. 1 for the upper apex seal 46 illustrated in that figure.
- $W_c$ is the total weight of the counterweight (both counterweights 76) for an apex seal including that portion of the weight of the associated lever arms 74 which is on the counterweight side of the pivot pins 72.
- $W_s$ is the total weight of the apex seal 46 including its weights 80 and extensions 66 as well as that portion of the weight of the associated lever arms 74 which is on the apex seal connection side of the pivot pins 72.
- $g$ is the acceleration of gravity which in the English system of units equals approximately 32 feet per second per second at sea level conditions.
- $a$ is the length of the arm of the lever 74 between its pivotal support connection 72 to the rotor and its pivotal connection 78 to the apex seal strip.
- $b$ is the length of the arm of the lever 74 on the counterweight side of its pivotal support 72, said length being equal to the distance between the axis of the pivot 72 and the center of mass of the counterweight 76.

As in said co-pending application, the length of the moment arms $a$ and $b$ of each lever 74 and the weight of each counterweight $W_c$ are so chosen that $$W_c = \frac{a}{b} W_s$$

When the weight of each apex seal $W_s$ and the weight of the counterweights 76 ($W_c$) for each apex seal and the moment arms $a$ and $b$ of the levers 74 have this relation, the apex seal is said to be statically balanced. If now this value of the weight $W_c$ of the counterweights is substituted in the previous equation for $Fn$, then the equation for $Fn$ simplifies as follows $$Fn = \frac{w^2 Ws}{g}(Rs - Rc)$$

As is apparent from this equation and as explained in said co-pending application, when the apex seal is statically balanced the force $Fn$ of each apex seal against the trochoidal surface resulting from centrifugal forces is constant for a given engine rotative speed ($w$), but the force increases as the square of the engine rotative speed. Accordingly, as the engine speed increases the contact pressure of each apex seal 46 against the trochoid surface 40 increases as the square of the engine speed. However, since the maximum seal contact pressure is required during engine starting and at low engine speeds, this increase in the seal contact pressure with engine speed results in an unnecessary and undesirable increase in energy loss because of the friction between the apex seals and the trochoid surface.

It should be noted that each apex seal 46 has little or no radial movement in its rotor slot 60. This is so as explained in prior U.S. Pat. No. 2,988,065 because the outer edge of each apex seal 46 traces or generates the trochoidal surface 40 as the rotor rotates. Therefore, substantially the only radial motion of each apex seal 46 in the slot 60 is such as to accommodate motion of the rotor 16 resulting from rotor bearing clearances and to accommodate manufacturing tolerances. Hence, the counterweights 76 which are pivotally connected to the apex seals 46 have very little pivotal movement about their pivot pins 72. For these reasons the radial distances $Rc$ and $Rs$ remain substantially constant throughout each revolution of the engine.

In addition to the force ($Fn$) the spring 62 acts under each apex seal strip 46 to urge the seal into contact with the trochoidal surface 40. In addition, as is well known in such rotary engines, the gas pressure in the engine working chambers 44 also acts under each apex seal to urge the seal against the trochoidal surface 40. Accordingly, the contact pressure of each apex seal against the trochoidal surface resulting from centrifugal forces is not required for adequate sealing. That is, the force $Fn$ is not needed for adequate apex seal contact pressure. From the equation for this force $Fn$ when the counterweights 76 are statically balanced, it is apparent that this force can be reduced to zero, or substantially zero, by making the term ($Rs-Rc$) equal to zero, or substantially zero. That is, the inertia effect on the seal contact pressure then becomes equal or substantially equal to zero for all rotative speeds of the engine and at all rotative positions.

In accordance with the invention and as already described, weights 80 are rigidly attached to each apex seal strip 46. The weights 80 are disposed so that their center of mass is disposed radially inwardly of the counterweights 76 to such an extent and their mass is of such size that the center of mass (shown at 90 in FIG. 3) of each apex seal (with its weights 80), is disposed at substantially the same radial distance $Rs$ from the rotor axis as the radial distance $Rc$ of the center of mass of the counterweights 76 from the rotor axis.

By center of mass of each apex seal is meant the center of mass of the apex seal strip 46 with its extensions 66 and weights 80 along with that portion of the weight of the associated lever arms 74 which is on the apex seal connection side of the pivot pins 72.

The center of mass of each apex seal strip 46 by itself is disposed radially outwardly of the center of mass 88 of the counterweights 76. Therefore, in order to bring the center of mass 90 of the entire apex seal structure (excluding counterweights 76) radially inwardly to approximately the same radial position as that of the counterweights 76, it is necessary that the center of mass 86 of the weights 80 be disposed radially inwardly of the center of mass 88 of the counterweights 76.

This location of the center of mass 90 of the apex seal with its weights 80 in which $Rs$ substantially equals $Rc$, can be accomplished by choosing the magnitude of the weights 80 for each seal strip 46 and the position of its center of mass so as to satisfy the following equation $$Wc' = \frac{c}{d} Ws'$$

where $Wc' + Ws' = Ws$, the term $Ws$ being hereinbefore defined.

$Wc'$ is the weight of the weights 80 for each apex seal strip 46.

$Ws'$ is the weight of each apex seal strip 46 plus its extension 66 and the portion of the associated lever arm 74 which is on the apex seal connection side of the pivot pins 72.

$c$ is the radial distance from the center of mass 92 of each apex seal strip (weight $Ws'$) to the center of mass 88 of the counterweights 76 (weight $Wc'$).

$d$ is the radial distance from the center of mass 88 of the counterweights 76 (weight $Wc'$) to the center of mass 86 of the weights 80 for each apex seal strip (weight $Ws'$).

In order to make $Rs$ equal to $Rc$ it is necessary that the term $Ws'$ include the weight of the extensions 66 and the weight of the portion of the associated lever arms 74 which is on the apex seal connection side of the pivot pins 72 so that the location of the center of mass 90 reflects the inclusion of the extensions 66 and these portions of the associated levers 74. In general, however, the weight of the extensions 66 and the weight of the levers 74 (excluding that of the counterweights 76) is so small as to be negligible.

Figure 6:
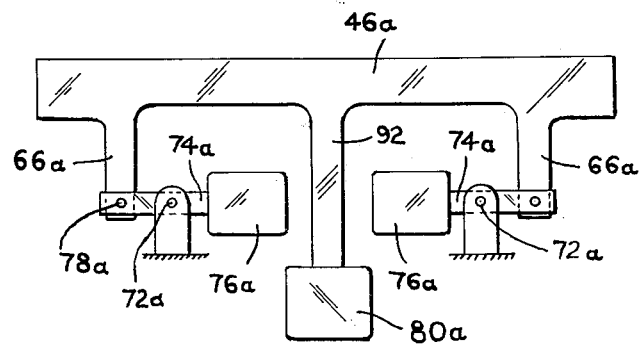
FIG. 6 is a schematic view of a modified form of the invention.

Instead of adding two weights 80 to each apex seal strip it is possible to add a single weight at the radially inner end of an extension 92 extending inwardly from the center of the seal strip as schematically illustrated in FIG. 6. FIG. 6 is otherwise like FIG. 3 and the parts of FIG. 6 corresponding to parts of FIG. 3 have been indicated by the same reference numerals but with a subscript $a$ added thereto. Accordingly no further description of FIG. 6 or its operation appears necessary.

It should be understood that the invention is not limited to the specific details of construction and arrangements thereof herein illustrated and that changes and modifications may occur to one skilled in the art without departing from the spirit and scope of the invention.

What is claimed is:

1. Counterweighted apex seal means for a rotary mechanism including a housing having an internal cavity with the peripheral surface of said cavity having a multi-lobe profile which is basically an epitrochoid, a shaft coaxial with said epitrochoidal peripheral surface and having a cylindrical eccentric portion disposed within said cavity and a rotor member having a plurality of apex portions and being journaled on said eccentric portion for planetary rotation within said cavity about the axis of said shaft such that said apex portions generate an epitrochoidal surface so as to have sealing cooperation with the epitrochoidal peripheral surface of said cavity, said counterweighted apex seal means comprising:

a. seal strip means carried by the rotor member at each of its apex portions adjacent to the rotor member periphery in a manner so that the seal strip means can move radially relative to the rotor for sealing cooperation with said housing epitrochoidal peripheral surface;

b. counterweight means carried by the rotor member radially inwardly of each of said seal strip means;

c. additional weight means connected to each said seal strip means and disposed radially inwardly of its associated seal strip means with the center of mass of said additional weight means being disposed radially inwardly of the center of mass of said counterweight means; and d. lever means for each seal strip means, each said lever means being pivotally supported by the rotor member and having a first portion connected to its seal strip means and having a second portion connected to the associated counterweight means such that the turning moment exerted on the lever means by the centrifugal force acting on the counterweight means during rotor member rotation is at all times opposed by the turning moment exerted on the lever means by the centrifugal force acting on the combined seal strip means and additional weight means and such that when the rotor member is at rest said turning moments are substantially equal and opposite.

2. Counterweighted seal means as claimed in claim 1 and in which said additional weight means is rigidly connected to the seal strip means.

3. Counterweighted seal means as claimed in claim 1 and in which said additional weight means is of such magnitude that the center of mass of the seal strip means without its counterweight means but with its additional weight means is disposed at substantially the same radial distance from the rotor center as is the center of mass of the counterweight means.

* * * * *